United States Patent [19]

Eibe

[11] 4,271,959
[45] Jun. 9, 1981

[54] COIL ROTATING COOLING CONVEYOR SYSTEM

[75] Inventor: Werner W. Eibe, McCandless Township, Allegheny County, Pa.

[73] Assignee: Blaw-Knox Foundry & Mill Machinery, Inc., Pittsburgh, Pa.

[21] Appl. No.: 972,903

[22] Filed: Dec. 26, 1978

[51] Int. Cl.³ .................................. B65G 25/00
[52] U.S. Cl. .......................... 198/777; 198/410; 242/79
[58] Field of Search ............. 198/751, 773, 777, 410, 198/952; 414/911, 759, 774; 432/124; 242/79

[56] References Cited

U.S. PATENT DOCUMENTS

| | | | |
|---|---|---|---|
| 2,144,281 | 1/1939 | Wuest | 198/777 X |
| 2,389,443 | 11/1945 | Lyle | 242/78 |
| 2,737,306 | 3/1956 | Wiig | 414/911 X |
| 3,545,600 | 12/1970 | Rudlaff | 198/751 |
| 3,584,736 | 6/1971 | DeMallie | 198/777 |
| 3,662,876 | 5/1972 | Hollis | 198/751 |
| 3,832,924 | 9/1974 | Mickler et al. | 198/773 X |
| 3,850,287 | 11/1974 | Petros | 198/774 |

*Primary Examiner*—Bruce H. Stoner, Jr.
*Assistant Examiner*—Douglas D. Watts
*Attorney, Agent, or Firm*—Buell, Blenko, Ziesenheim & Beck

[57] ABSTRACT

Coils of hot strip from a hot strip mill downcoiler are transferred broadside and set down with the coil eye horizontal on a walking beam conveyor. The conveyor comprises elongated transfer members pivoted at their lower end below the path of coil travel which swing toward and away from each other. Each transfer member has a coil-supporting platform on its upper end and coils are passed from one transfer member to the next when they approach each other, both at the intersections of their arcuate paths and at a point in each arcuate path intermediate those intersections, so that each coil is rotated about its axis during travel, but without rolling.

13 Claims, 12 Drawing Figures

COIL ROTATING COOLING CONVEYOR SYSTEM

This invention relates to cooling conveyors for hot coils of strip. It is more particularly concerned with such conveyors which carry the coil with the eye in the horizontal position.

Hot strip mills are provided with two or sometimes three coilers, each of which in turn coils the hot strip from the mill into a coil and delivers the coil onto a conveyor which carries it away from the mill and allows the hot coil of strip to cool to a temperature at which the coil may be handled without damage. The strip is, of course, coiled on a horizontal mandrel and conventionally the hot coils have been turned 90° or "down-ended", as it is called, so as to be conveyed with the hole or the coil eye vertical. This has been done because hot coils set down on a flat surface with the eye horizontal sag and become egg-shaped. The strip when hot does not have enough strength to support itself in this position.

However, there is a considerable disadvantage in delivering hot coils in the eye vertical position. The successive wraps or turns of hot strip are never coiled with their edges accurately in line and protruding wraps or turns on the lower end of the coil are damaged when the hot coil is down-ended. The coil must, therefore, be trimmed, resulting in a considerable scrap loss.

Recently, to avoid this loss, attention has been directed to means for conveying hot coils with the eye horizontal. Apparatus has been engineered to carry hot coils in V-shaped supporting means. In such apparatus, the coils are supported essentially along two lines of contact, and coil sag is less than it is when the coil is supported only on a bottom line of contact. An optimum angle of the V-shaped conveyor pallets, mathematically determined, has been proposed which minimizes the coil collapse. However, the coil will still sag a certain amount which depends on several factors but mainly tightness and temperature. A tightly wound coil will not sag appreciably if it can be kept tight during transfer. Many coils, however, will loosen up when stripped off the downcoiler mandrel, even when banded as soon as possible. Weight of coil, degree of looseness and temperature will then determine the amount of sagging when the coil rests on its circumferential surface. Only a rotating or rolling motion of the coil would equalize the coil sagging. Coil rolling is not favored in the industry since it tends to damage the outer turns and also further loosen the coil.

It is an object of my invention to provide a coil conveyor for hot coils carried with the eye horizontal which prevents sagging of the coils. It is another object to provide such a conveyor which prevents sagging of coils of different diameters. It is another object to provide method and apparatus for conveying hot coils with their eyes horizontal along a path normal to their axes without allowing the coils to sag. It is still another object to provide method and apparatus for loading and unloading coils broadside of my conveyor. Other objects of my invention will appear in the course of the description thereof which follows.

My conveyor is a walking-beam type conveyor which transfers each coil from station to station along the conveyor in a path normal to the coil axes. Each coil is caused to rotate about its axis through an angle during this transfer, but without rolling, so that the coil is supported on successive regions of its outside wrap as it moves along the conveyor, thus equalizing the tendancy to sag and preserving circularity of the coil. The length of my conveyor need be only enough to allow the coil to cool to a safe temperature, after which the coils can be transferred to any conventional type of conveyor.

An embodiment of my invention presently preferred by me is illustrated in the attached figures, to which reference is now made.

FIG. 11 is an end elevation of take-off apparatus adapted for my conveyor.

Figure 1:
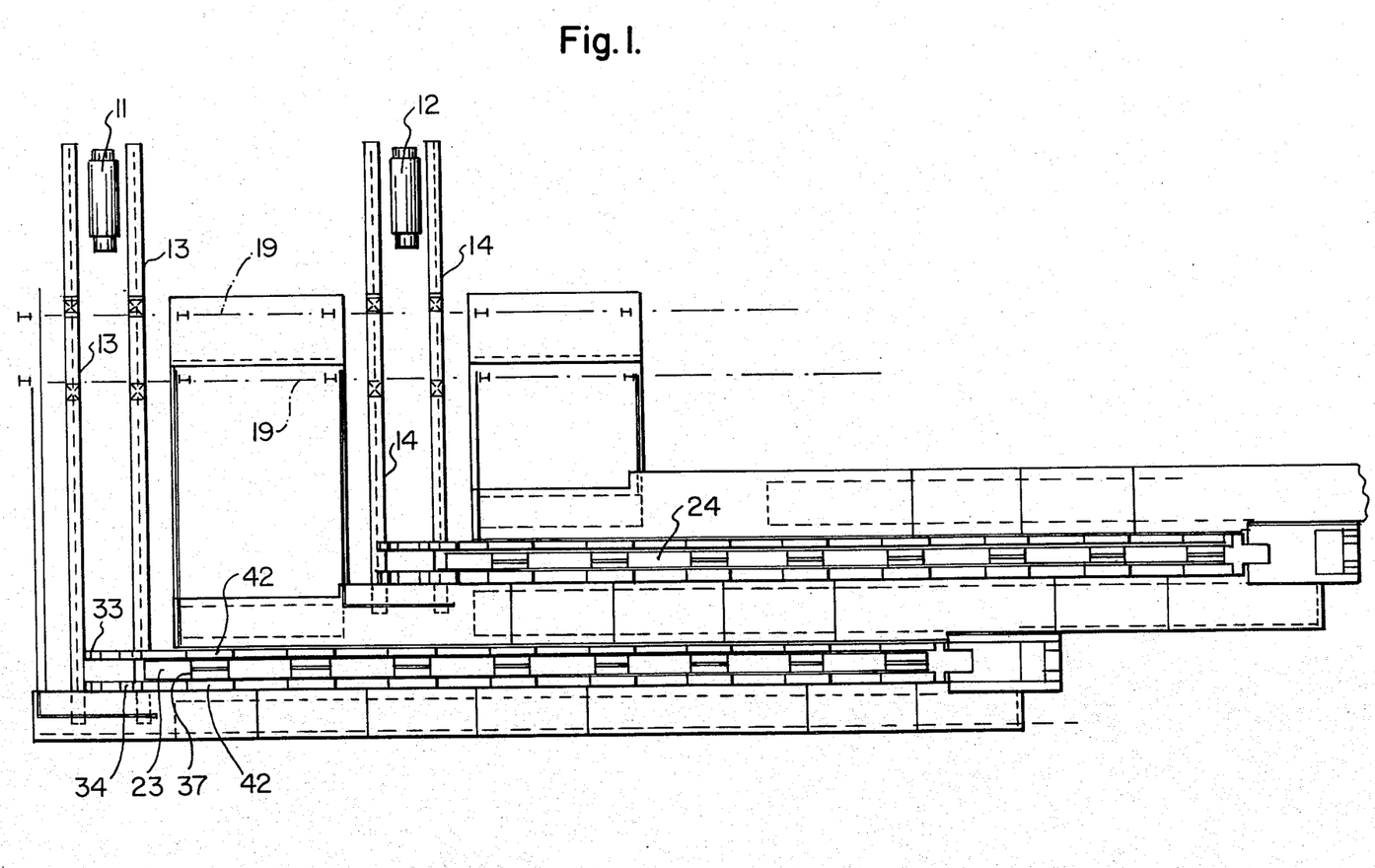
FIG. 1 is a plan of two parallel conveyors of my invention, positioned to receive coils from separate downcoilers.
Figure 2:
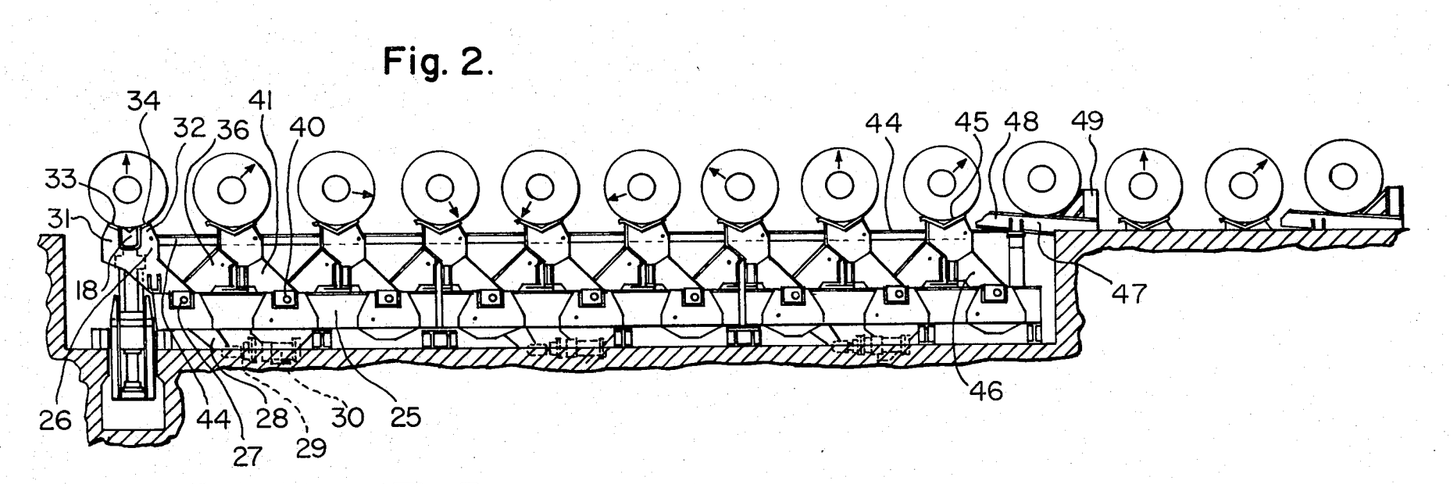
FIG. 2 is an elevation of one of the conveyors of FIG. 1
Figure 2:
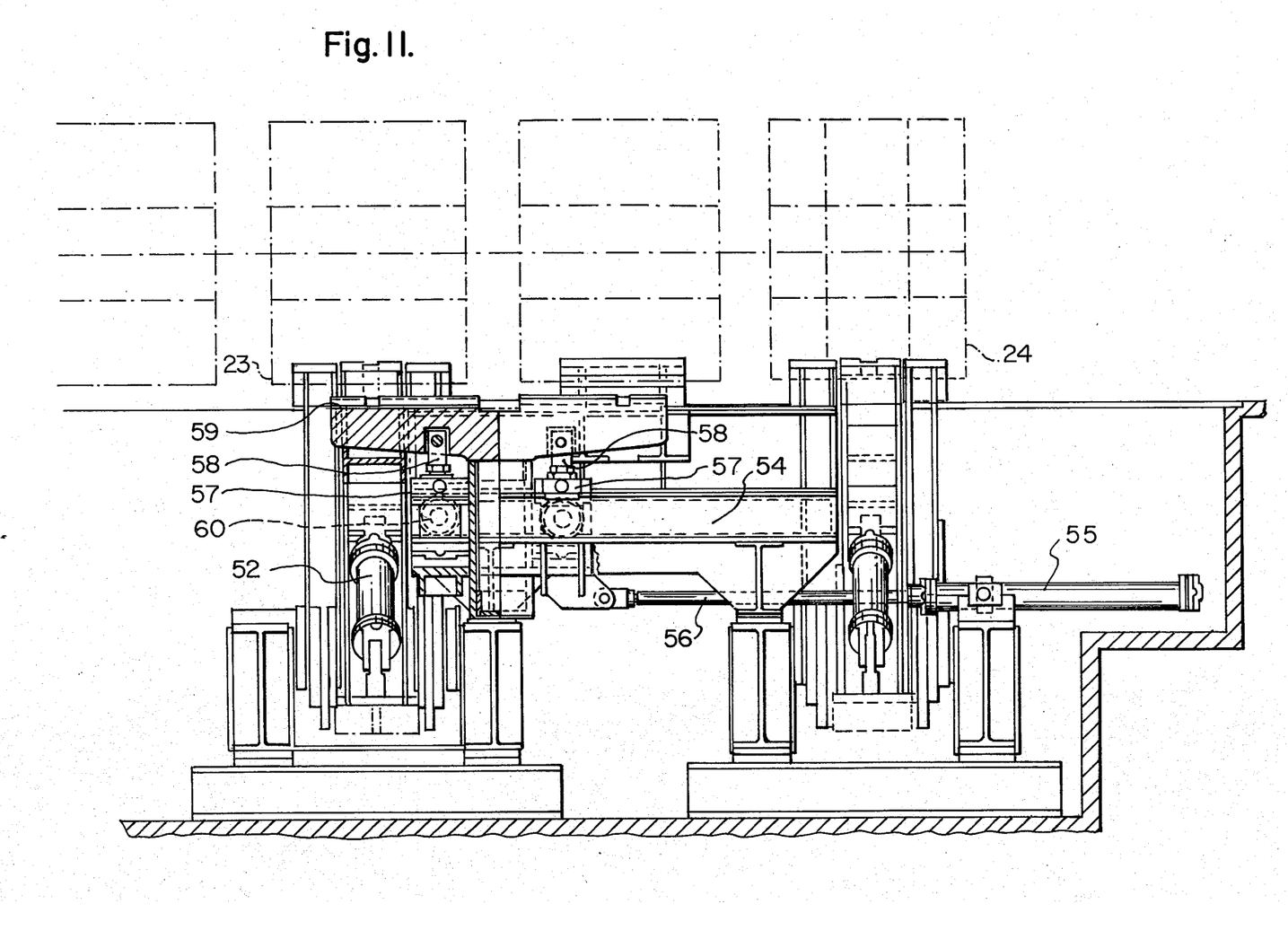
Figure 3:
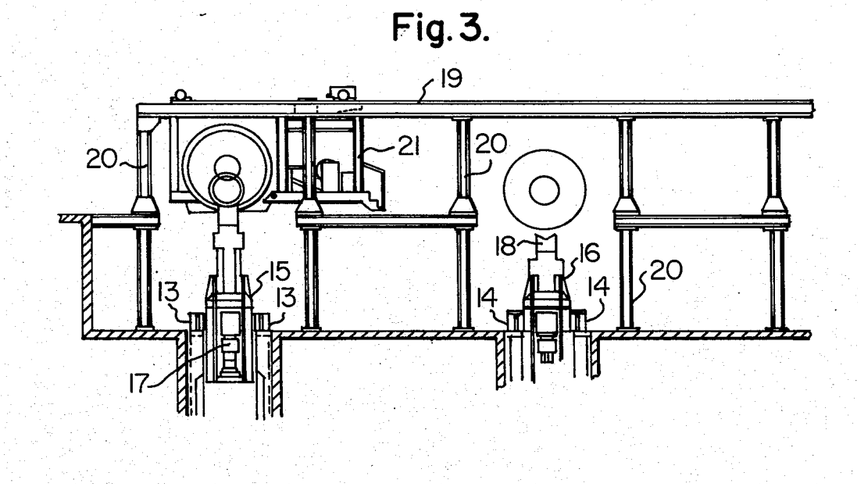
FIG. 3 is an elevation of traveling coil banding apparatus, and of the coil transfer cars, for the two downcoilers.
Figure 4:
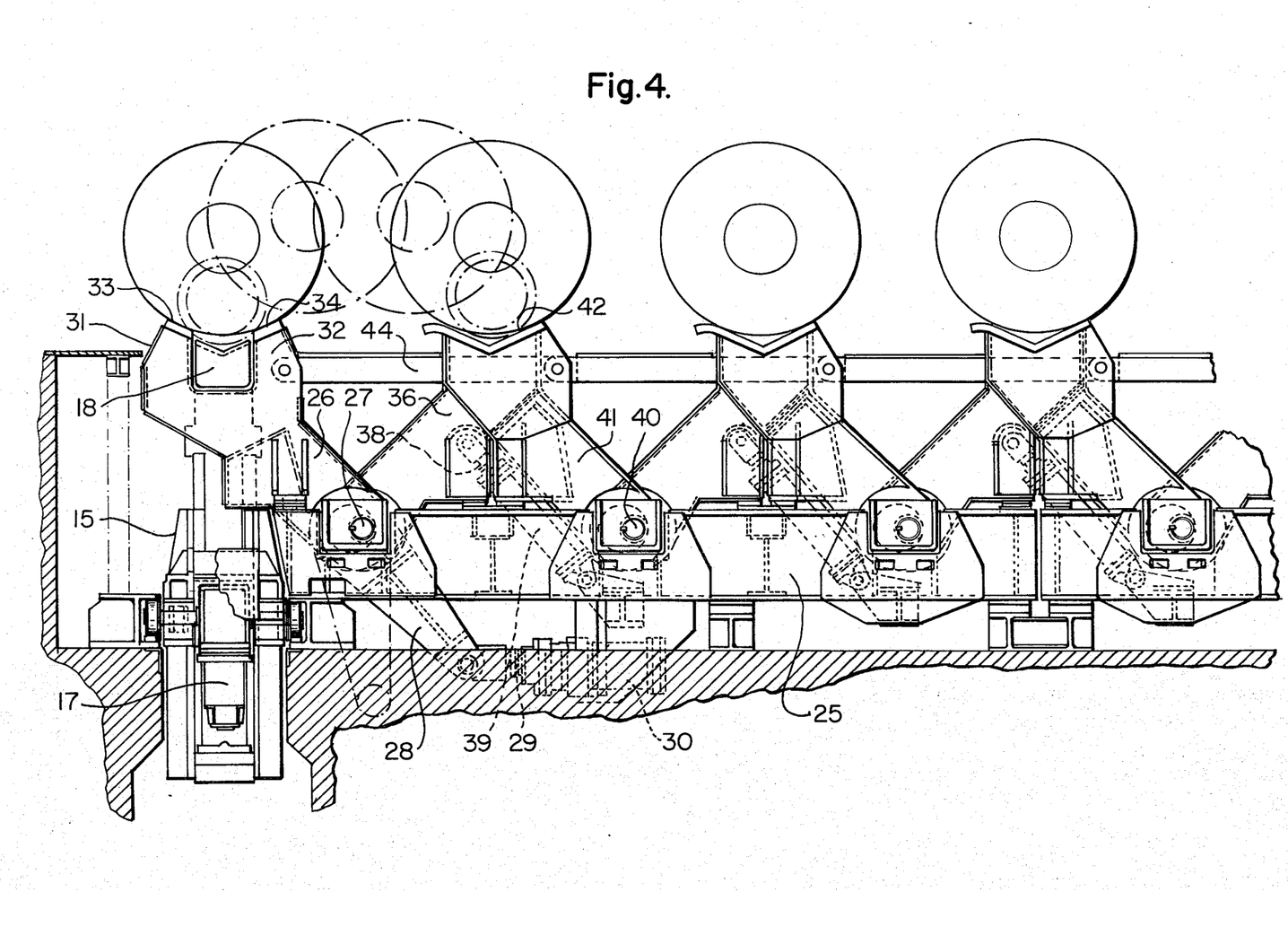
FIG. 4 is an enlarged detail elevation of the apparatus of FIG. 2 showing the path of coil travel along the conveyor.

In FIG. 1 conventional downcoilers 11 and 12 are positioned in tandem below the run-out table of a hot strip mill. A pair of rails 13 is disposed below downcoiler 11 normal to the mill run-out table, and a like pair 14 is disposed below downcoiler 12. A coil transfer car 15, shown in elevation in FIG. 3, travels on rails 13, and a like transfer car 16 travels on rails 14. Transfer cars 15 and 16 carry the coils broadside from their respective downcoilers with the eye horizontal. Each transfer car is provided with a horizontal support bar 18 on which the coil rests after it leaves its downcoiler. The bar 18 is raised or lowered by hydraulic cylinder 17. A pair of rails 19, shown only by center line in FIG. 1 but in elevation in FIG. 3, is supported on frame work 20 above rails 13 and 14 and normal thereto, adjacent and above downcoilers 11 and 12. On rails 19 a conventional coil banding machine 21 travels so that it can be positioned to secure a band around a coil from downcoiler 11 and then moved to band a coil from downcoiler 12. Rails 13 terminate at right angles to a walking beam conveyor 23 and rails 14 terminate at a like parallel conveyor 24. A conveyor 23 in elevation is shown in FIGS. 2 and 4.

Conveyors 23 and 24 are each supported by a pair of longitudinal members 25 spaced below the path of travel of the coils. A first bifurcated transfer member 26 is mounted between members 25 on a pivot 27 so as to have a minor portion 28 of each leg extending below member 25. The lower end of each leg 28 is connected to the piston 29 of a hydraulic cylinder 30, which is connected at its other end with member 25. Operation of cylinder 30 swings the upper end of member 26 through an arc to be described hereinafter. As is shown in FIG. 2, cylinder 30 may comprise several cylinders in tandem, if desired. The upper extremity of member 26 is forked transversely of conveyor 23, the forks 31 and 32 being separated a distance sufficient to span support bar 18 of transfer cars 15 or 16. In turn, forks 31 and 32 are each split longitudinally of conveyor 23 by an amount to be described hereinafter. The upper faces 33 and 34 of forks 31 and 32, respectively, are inclined upwardly away from the gap between them, so as to form a V-shaped coil supporting platform higher at its upstream and downstream edges than between its edges.

Also pivoted about pivot 27 inside the legs of member 26 is a second transfer member 36. The extreme upper end of member 36 terminates in a coil supporting platform 37 dimensioned to fit between the two elements of fork 31 and the two elements of fork 32. Platform 37 is also V-shaped, and formed higher at its upstream and downstream edges as is shown in FIG. 1. Platform 37 is also split parallel to the length of conveyor 23, so as to leave room for the bands around the coils. The piston 38 of a hydraulic cylinder 39 is pivotally connected to member 36 near its upper end and the cylinder is pivotally connected to member 25 downstream of pivot 27. The V-shaped coil supporting platform 33 and 34 of first transfer member 26 is inclined to the long axis of that member and the coil supporting platforms of successive first transfer members are likewise inclined. The V-shaped coil supporting platforms 37 of second transfer members 36 are inclined to the long axes of those members and the coil supporting platforms of adjoining first transfer members and downstream second transfer members are inclined toward each other, as is evident from FIGS. 5–10.

Spaced from pivot 27 downstream thereof along member 25 is a pivot 40 and pivotally mounted thereon at its lower end is a transfer member 41. Although member 41 is somewhat different in structure from first transfer member 26, as will appear, it operates in the same way and is, in fact, for conveying purposes, a duplicate of member 26. Member 41 comprises two side pieces spaced apart transversely of conveyor 23 so as to straddle member 36, and each side piece has at its upper end a V-shaped coil platform 42, the two platform elements 42 straddling platform 37 of member 36 when the two members swing together. In that position, the platform elements of the two members coincide in supporting a coil thereon. Members 26 and 41 are pivotally connected at their upper ends by a link 44 so that those members pivot in unison.

The remainder of conveyor 23 is merely a repetition of the structure already described. The next transfer member downstream of member 41 is a duplicate of member 36, and the next following member downstream is a duplicate of member 41, and so on. All successive members corresponding to member 41 are connected together and to member 41 by links identical with link 44. All transfer members corresponding to member 36 are provided with individual hydraulic cylinders and pistons corresponding to cylinder 39 and piston 38.

After the coils have traveled the length of my conveyor, it is necessary to remove them therefrom, but before describing my apparatus therefor, I shall explain the transferring operation of my conveyor with reference to FIGS. 5 through 10.

Figure 5:
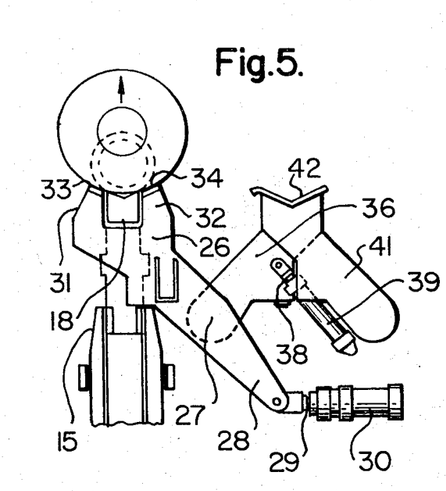
FIGS. 5 through 10 are detail views of coil transfer members of my conveyor in successive steps of coil transfer.
Figure 6:
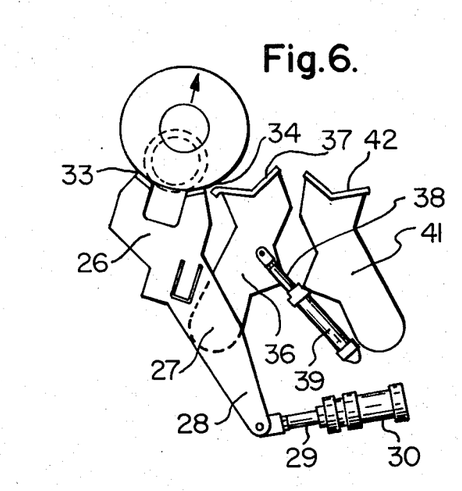

In those Figures, the outlines of coils of maximum and minimum outside diameter are shown in certain successive stages of coil transfer and rotation. In FIG. 5 the first transfer member 26 is shown with its upper end in its upright position so that forks 31 and 32 permit support bar 18 of a coil transfer car to pass therebetween transversely of conveyor 23. The coil supported by support bar 18 is moved broadside onto conveyor 23 and lowered by cylinder 17 onto the coil supporting platform comprising upper faces 33 and 34 of forks 31 and 32 of member 26. Second transfer member 36 is also in its upright position in which its coil supporting platform 37 is meshed with coil supporting platform 42 of member 41. After support bar 18 is withdrawn, hydraulic cylinder 30 is actuated to extend piston rod 29, which swings arm 26 clockwise about its pivot 27 as viewed in the figures. The coil is thus lifted by coil supporting platform 33 and 34 as is shown in FIG. 6, and is also moved clockwise about pivot 27, which results in a point of its circumference being turned through an angle with respect to the position of that point in FIG. 5. This is shown in the FIGURES by the change in relative position of the arrow on the coil. At the same time hydraulic cylinder 39 is actuated to extend piston rod 38 which swings second transfer member 36 around pivot 27 counter-clockwise toward first transfer member 26. The motion of second transfer member 36 continues until its coil supporting platform 37 makes contact with the coil surface as in FIG. 7. The broken line position of member 36 in that figure is its coil contact position for a coil of minimum diameter, as shown in that figure. The coil supporting platforms of the two members make overlapping contact with the coil surface, in that successive regions of coil surface in contact with supporting means are offset from each other.

Figure 8:
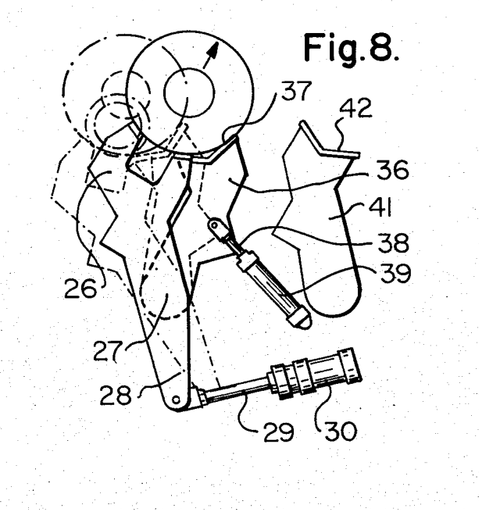
Figure 9:
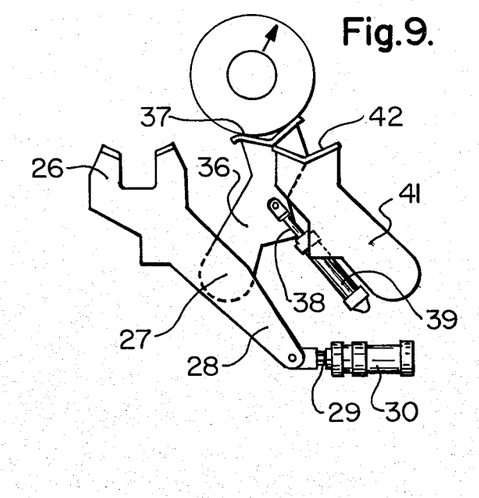

Piston 29 is extended to its full length as shown in FIG. 8, causing first transfer member 26 to swing to its extreme clockwise position and at the same time, piston 38 is retracted somewhat, causing second transfer member 36 to begin a clockwise swing. At the extreme clockwise position of first transfer member 26, its coil supporting platform 33 and 34 is higher than coil supporting platform 37 of second transfer member 36 and the weight of the coil is transferred to platform 37. As the coil supporting platforms make contact with the coil exterior over offset or non-coterminous regions, the coil is effectively rotated a certain amount with respect to its support, as shown by the arrows, but without rolling.

As has been mentioned, the upper ends of first transfer members 26 and 41 are tied together by a link 44, and member 41 has swung clockwise to the same extent as member 26. After the coil has been transferred to coil supporting platform 37 of second transfer member 36, cylinder 30 is actuated to retract piston 29 and swing members 26 and 41 counter-clockwise, as in FIG. 9. At the same time cylinder 39 is actuated to retract piston 38, swinging second transfer member 36 clockwise. When piston 38 is fully retracted, coil supporting platform 37 of member 36 meshes fully with coil supporting platform 42 of member 41, as appears in FIG. 10, and the coil is supported by the meshed platforms. The effective rotation imparted to the coil is shown by the difference in position of the arrows in FIGS. 5 and 10. The cycle described above is repeated as the coil travels along the conveyor, in arcuate path segments, from successive first transfer members to successive downstream second transfer members, and from these members to successive downstream first transfer members. At each transfer the coil is supported on a somewhat different region of its exterior, so that the direction of sag is effectively shifted.

It will be observed from the above description that my apparatus transfers coils along a path comprising a series of intersecting arcuate segments as is made evident in FIG. 4. In that path each coil is transferred from a first transfer member to a downstream second transfer member at a point in its segmental path intermediate the intersections of that segment with adjoining segments.

Figure 7:
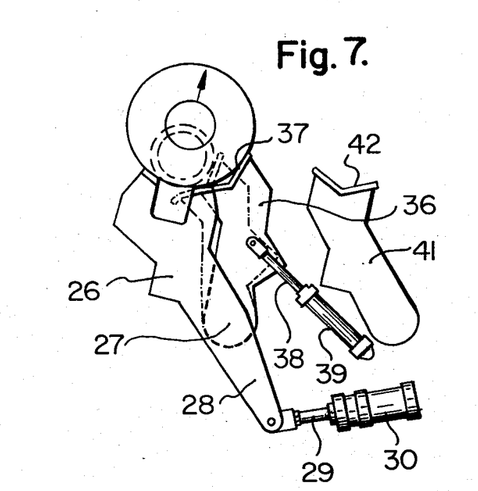
Figure 10:
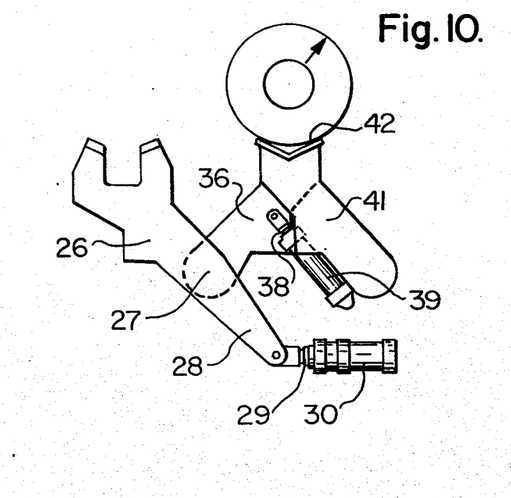

That transfer is shown in FIGS. 7 and 8. Furthermore, each coil is also transferred from a second transfer member to a downstream first transfer member at an intersection of adjoining path segments as is shown in FIG. 10.

One form of coil take-off apparatus is shown in FIG. 1. The exit coil transfer member 46 is a first transfer member tied to first transfer member 26 by successive links 44. A chute 47 inclined downwardly from conveyor 23 is located downstream of exit coil transfer member 46 with its upper end 48 fixed in the position receiving platform 37 in FIG. 8. A backstop 49 is fixed at the lower end of chute 47. When exit transfer member 46 swings to the position of first transfer member 26 in FIG. 8, the coil rolls from platform 45 of member 46 onto the upper end 48 of chute 47 and down that chute to backstop 49. The coil may be removed therefrom by any conventional apparatus.

Figure 12:
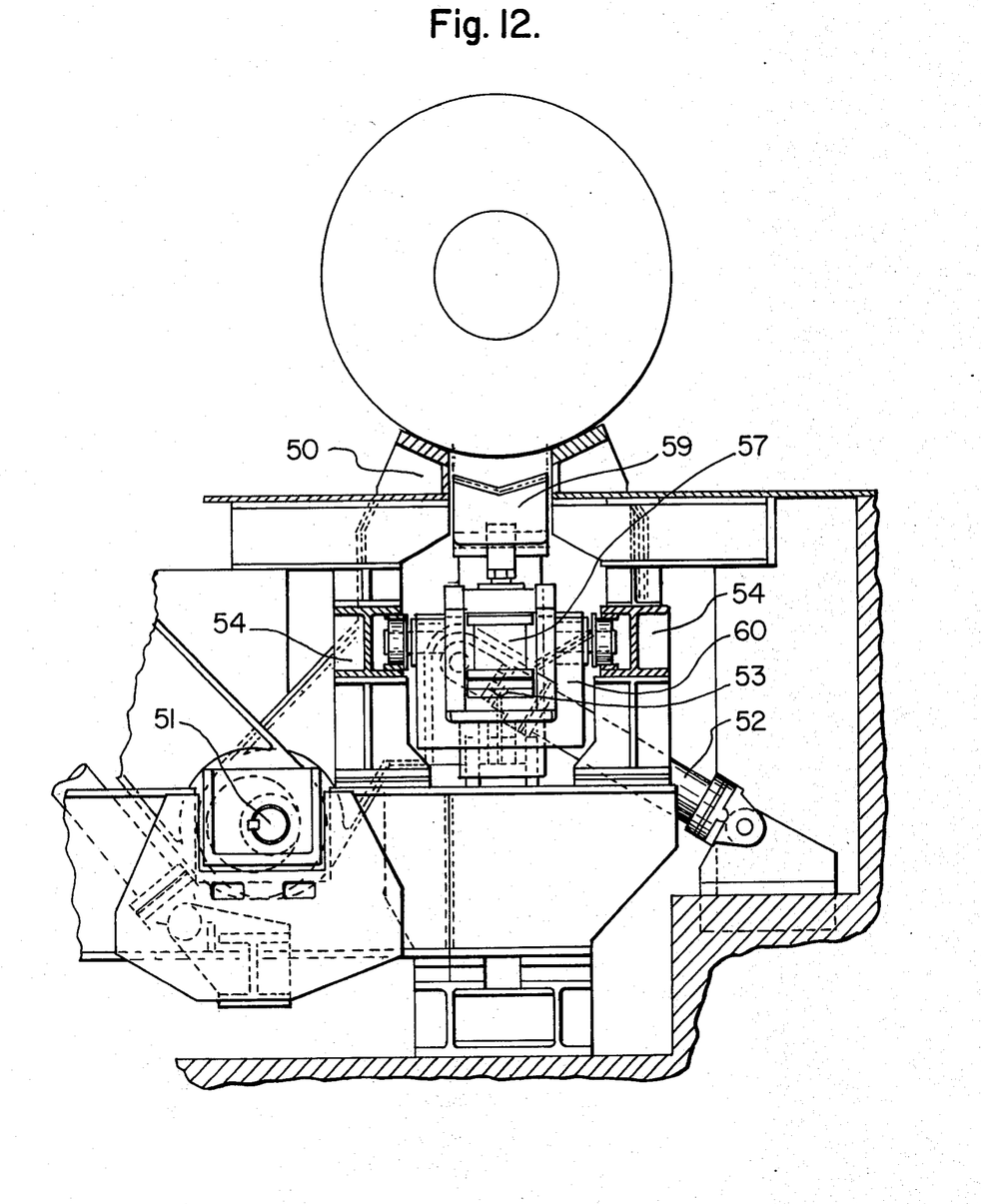
FIG. 12 is a side elevation of the apparatus of FIG. 11.

Another embodiment of coil take-off apparatus is shown in FIGS. 11 and 12. This embodiment is designed to transfer coils laterally from the exit ends of my conveyors 23 and 24 to a conventional conveyor for coils with the eye horizontal, disposed between my conveyors and parallel to them. The transfer mechanism is of the walking-beam type which lifts a coil from the exit end of either of my conveyors, moves it laterally over to a conventional conveyor, and sets down on that conveyor.

In order that my conveyor may load coils onto this transfer mechanism, the exit second transfer member 50 of each of my conveyors 23 and 24, so far as it extends above its pivot point 51, is a mirror image of first transfer member 26. It is swung by hydraulic cylinder 52 and piston 53, the other end of cylinder 52 being pivotally mounted on a fixed anchorage. Parallel horizontal spaced apart rails 54 are fixedly mounted crossways of conveyors 23 and 24 below the path of travel of the conveyors and symmetrically with respect to the extreme clockwise position of transfer members 50. On those rails a four-wheeled transfer car 60 is positioned to travel, moved by hydraulic cylinder 55 pivotally anchored and its piston rod 56 which is attached to car 60. On transfer car 60 are mounted two vertical hydraulic cylinders 57 having pistons 58 which jointly support a horizontal transverse coil support bar 59 similar to support bar 18. Bar 59 fits between the forks of transfer members 50, in the same way that coil support bar 18 fits between forks 31 and 32 of first coil transfer member 26. Coil support bar 59 is long enough to accommodate two coils thereon side-by-side.

In the position shown in FIG. 11, one end of support bar 59 is below coil conveyor 23 and the other end below a conventional coil conveyor located between conveyors 23 and 24. When a coil on conveyor 23 is transferred to member 50 and the latter is swung to its extreme clockwise position, cylinder 55 is actuated to move car 60 toward conveyor 23 so that support bar 59 in its lowermost position passes between the forks of transfer member 50, so as to be beneath the coil carried thereon. Hydraulic cylinders 57 are then activated to raise support bar 59, lifting the coil off member 50. Hydraulic cylinder 55 is then activated to move car 60 toward conveyor 24, stopping it when the coil on support bar 59 is positioned over the central conventional coil conveyor. Cylinders 57 are then actuated to lower support bar 59, allowing the coil to rest on the conventional conveyor. When a coil reaches the exit member of conveyor 24, car 60 is moved toward that conveyor until the other end of support bar 59 passes between the forks of exit member 50 of that conveyor, and the transfer to the conventional conveyor is completed in the way described for conveyor 23.

My apparatus above described is also adapted to transfer coils from conveyors 23 and 24 to a conventional coil conveyor positioned normal to conveyors 23 and 24 on either side thereof. Such conventional conveyor transports the coils broadside along a path coinciding with their axes. In FIG. 11 the outline of a coil to the left of the coil on conveyor 23 indicates the position of such a conveyor. In that arrangement an intermediate coil position is required between conveyors 23 and 24, which is that corresponding to the outline of the coil between the coils on conveyors 23 and 24 in the figure. This intermediate position is needed to accommodate coils coming from conveyor 24. Rails 54 are extended to the left of conveyor 23 in the figure to a position beneath the coil shown in outline to the left of conveyor 23. As conveyors 23 and 24 are both fed from the same mill, coils are loaded onto them alternately. Transfer car 60, in the manner above described, starting from its position shown in FIG. 11, transfers a coil from conveyor 23 to the conventional conveyor alongside it. It then returns to its extreme position to the right of FIG. 11 and transfers a coil arriving on conveyor 24 to the intermediate position in order to clear conveyor 24. When the next coil arrives on conveyor 23, transfer car 60 picks up that coil and the coil in the intermediate position and transfers the first mentioned coil onto the conventional conveyor and the second onto the vacant place on conveyor 23. From there transfer car 60 transfers that coil to the conventional conveyor and then travels to its extreme right position to receive the next coil from conveyor 24.

I have previously mentioned that although all first transfer members are swung at the same time to the same extent, the second transfer members have individual means to swing them. This is necessary to transfer in succession coils of different outside diameters without rolling the coils. In a hot strip mill coils are rolled on the mill to the customer's specification, as to weight as well as to other factors. An order may require only one coil or may require a number of coils of the same weight and coils of various orders are rolled on the mill in succession and delivered to the conveyor. FIGS. 7 and 8 make it clear that the swings of the second transfer members must be accommodated to the diameters of the coils they receive, and this makes individual control of those swings necessary if the coil is to be transferred without rolling.

In the foregoing specification I have described a presently preferred embodiment of my invention; however, it will be understood that my invention can be otherwise embodied within the scope of the following claims.

I claim:

1. A walking beam type coil conveyor for conveying hot coils of strip in the eye horizontal position along intersecting arcuate path segments normal to the coil axes comprising a plurality of first coil transfer members and a plurality of second coil transfer members, said members being pivotally positioned along the conveyor, each first member and downstream second member being pivoted about the same axis, each member having a coil supporting platform at its free end, first motive means attached to said first coil transfer membes and second motive means attached to said second coil transfer members, said first and second motive means causing said first and second coil transfer members to swing toward and away from each other through said arcuate path segments so as to transfer coils from said first coil transfer members to downstream second coil transfer members in areas of path segments intermediate their intersections with adjoining path segments and to transfer coils from said second coil transfer members to downstream first coil transfer members at intersections of said path segments, whereby during at least some of said transfers coils are caused to rotate about their axes but without rolling.

2. Apparatus of claim 1 in which the members of one plurality of coil transfer members are successively joined at their upper ends with links.

3. Apparatus of claim 1 in which one motive means comprise individual motive means for members of one plurality only of coil transfer members.

4. Apparatus of claim 1 in which said first coil transfer members and downstream second coil transfer members support a coil jointly over regions of contact thereon offset with respect to each other.

5. Apparatus of claim 1 in which said coil supporting platforms are V-shaped.

6. Apparatus of claim 5 in which said coil supporting platforms of said first coil transfer members mesh with said coil supporting platforms of said second coil transfer members so that adjoining second and down-stream first coil transfer members jointly support a coil over substantially the same area of contact.

7. Apparatus of claim 5 in which said coil supporting platforms of said first and second coil transfer members are inclined to the long axes of those members and toward each other.

8. Apparatus of claim 7 in which the angle of inclination of said coil supporting platforms of said first coil transfer members is substantially equal to the angle of inclination of said coil supporting platforms of said second coil transfer members.

9. Apparatus of claim 1 in combination with means for loading hot coils onto the entry first coil transfer member, said means comprising a horizontal coil support bar attached to said loading means and means attached to said loading means for moving said bar laterally of the conveyor, and in which the upper end of said entry first coil transfer member is forked so that said coil support bar passes between said forks.

10. Apparatus of claim 9 including means attached to said loading means for raising and lowering the coil support bar so as to transfer a coil therefrom onto said entry first coil transfer member.

11. Apparatus of claim 9 including a pair of rails positioned above the coil support bar parallel to said path of travel and coil banding means mounted on those rails so as to be moved thereon toward the coil support bar to band a coil supported thereon and then to be moved away therefrom.

12. Apparatus of claim 9 in combination with means for unloading hot coils from the exit second coil transfer member, said means comprising a horizontal coil support bar attached to said loading means and means attached to said unloading means for moving said bar laterally of the conveyor, and in which the upper end of said exit second coil transfer member is forked so that said coil supporting bar passes between said forks.

13. Apparatus of claim 12 including means attached to said unloading means for raising and lowering the coil support bar so as to transfer a coil thereto from the exit second coil transfer member.

* * * * *

UNITED STATES PATENT AND TRADEMARK OFFICE
CERTIFICATE OF CORRECTION

PATENT NO. : 4,271,959
DATED : June 9, 1981
INVENTOR(S) : WERNER W. EIBE

It is certified that error appears in the above-identified patent and that said Letters Patent are hereby corrected as shown below:

Column 5, line 7, "1" should be --2--.

Column 5, line 12, "37" should be --42--.

Claim 1, column 6, line 66, "membes" should be --members--.

Signed and Sealed this

Eighth Day of September 1981

[SEAL]

Attest:

Attesting Officer

GERALD J. MOSSINGHOFF

Commissioner of Patents and Trademarks